No. 828,108. PATENTED AUG. 7, 1906.
C. L. GRAHAM.
VISIBLE FLUID FEED INDICATOR.
APPLICATION FILED AUG. 5, 1905.
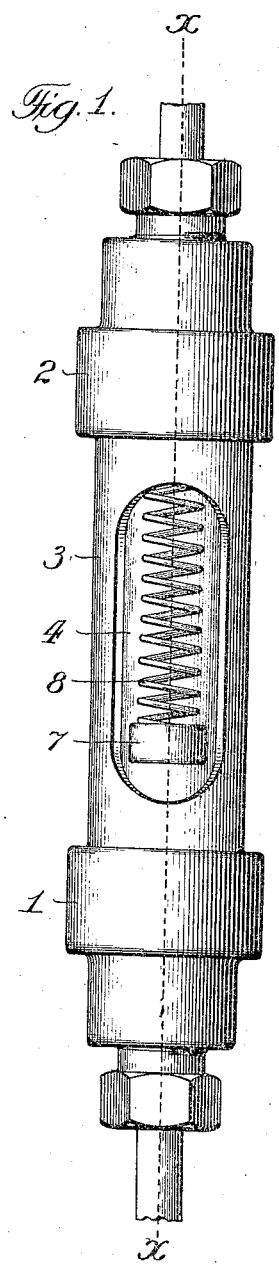
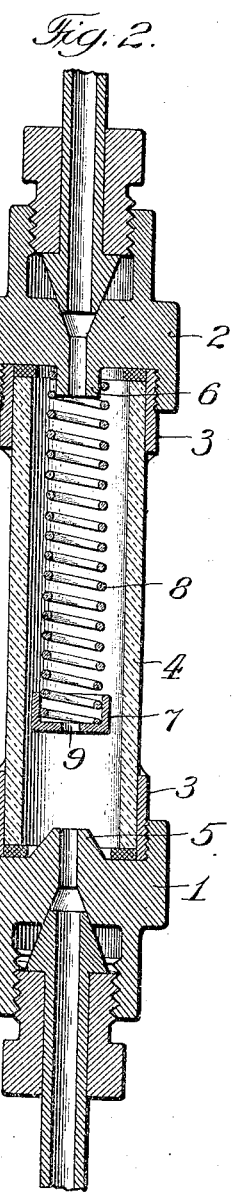
Attest:
John Enders,
M. H. Holmes.
Inventor:
Chauncey L. Graham,
by Robert Burns
Attorney.

UNITED STATES PATENT OFFICE.

CHAUNCEY L. GRAHAM, OF CHICAGO, ILLINOIS, ASSIGNOR TO ARVILLA M. GRAHAM, OF CHICAGO, ILLINOIS.

VISIBLE FLUID-FEED INDICATOR.

No. 828,108.  Specification of Letters Patent.  Patented Aug. 7, 1906.

Application filed August 5, 1905. Serial No. 272,799.

*To all whom it may concern:*

Be it known that I, CHAUNCEY L. GRAHAM, a citizen of the United States of America, and a resident of Chicago, in the county of Cook and State of Illinois, have invented certain new and useful Improvements in Visible Fluid-Feed Indicators, of which the following is a specification.

This invention relates to a visible-feed indicator for force-feed lubricators and other like apparatus from which the flow is of an intermittent nature; and the present improvement has for its object to provide a durable and effective structural arrangement and combination of parts whereby a conspicuous indication is given of the intermittent flow of a lubricant or like fluid through the indicator, all as will hereinafter more fully appear and be more particularly claimed.

In the accompanying drawings, Figure 1 is a front elevation of a visible-feed indicator embodying the present invention. Fig. 2 is a vertical section of the same on line $x$ $x$, Fig. 1.

Similar numerals of reference indicate like parts in both views.

Referring to the drawings, 1 and 2 are substantially counterpart end heads constituting the inlet and outlet trunks of the indicator and adapted for connection with the opposed ends of the tube, the flow through which is to be visibly indicated as usual in the present class of indicators.

3 is a skeleton casing adapted to connect the end heads together in a substantial manner and afford a protection to the transparent sight-tube 4 of the indicator as usual.

5 and 6 are the inlet and outlet nipples of the end heads, preferably arranged in axial alinement, as shown.

The present invention comprises the provision in a transparent wall-indicator, of any usual and suitable form, of an indicating means as follows:

7 is an indicator body or member of any suitable form and material loosely arranged in the interior of the indicator in the path of the flow of fluid through the same and inside of a transparent wall of the indicator. Such body or member is preferably of a color in strong contrast with the color of the fluid passing through the indicator, so that a movement of said body or member due to a flow or pulsation of the fluid, as hereinafter more fully set forth, will be glaringly visible to the party in charge of the apparatus.

8 is a supporting connection attached to the body or member 7 (whereby the latter is suspended) and to an interior fixed part of the indicator and adapted to maintain the said body or member 7 in a visible position behind a transparent wall of the indicator and at the same time confine the movement of the said member within the interior of the indicator. In the preferred form of the present invention said supporting connection will consist of a light spring of a coiled or serpentine form and is adapted to permit of a free upward movement of the body or member 7 under the influence of a pulsating or intermittent flow through the indicator and at the same time cause a down or return movement of said body or member before a succeeding pulsation of the fluid takes place.

The indicator body or member is preferably of a cup shape, as shown in Fig. 2, so as to nearly occupy the transverse area of the transparent sight-tube 4, in which it is arranged, and such cup-shaped member is provided with one or more orifices 9 to permit the passage of the fluid in a down or return movement of said member in the practical operation of the appliance.

The present indicator is more especially intended for use with class of force-feed lubricators in which a series of single-acting pumps are employed to force the lubricant to a series of bearings at recurring intervals.

Having thus fully described my said invention, what I claim as new, and desire to secure by Letters Patent, is—

1. A visible fluid-feed indicator comprising a lower head, an upper head, a cylindrical skeleton casing having its ends secured in the heads, a transparent tube within the casing, an indicator, and a coiled spring whereby the indicator is suspended within the tube from the upper head.

2. A visible fluid-feed indicator comprising a lower head having a nipple, an upper head having a nipple, a cylindrical skeleton casing having its ends secured in the heads around the nipples, a transparent tube within the casing, an indicator, and a coiled spring whereby the indicator is suspended within the tube from the nipple of the upper head.

3. A visible fluid-feed indicator comprising a lower head, an upper head, a cylindrical skeleton casing, having its ends secured in the heads, a transparent tube within the casing, a cup-shaped indicator, and a coiled spring whereby the cup-shaped indicator is suspended within the tube from the upper head.

4. A visible fluid-indicator comprising a lower head having a nipple, an upper head having a nipple, a cylindrical skeleton casing having its ends secured in the heads around the nipples, a transparent tube within the casing, a cup-shaped indicator, and a coiled spring whereby the indicator is suspended within the tube from the nipple of the upper head.

5. A visible fluid-feed indicator comprising a lower head, an upper head, a cylindrical skeleton casing, having its ends secured in the heads, a transparent tube within the casing, a cup-shaped indicator having an orifice for the passage of fluid, and a coiled spring whereby the cup-shaped indicator is suspended within the tube from the upper head.

6. A visible fluid-indicator comprising a lower head having a nipple, an upper head having a nipple, a cylindrical skeleton casing having its ends secured in the heads around the nipples, a transparent tube within the casing, a cup-shaped indicator having an orifice for the passage of fluid, and a coiled spring whereby the indicator is suspended within the tube from the nipple of the upper head.

Signed at Chicago, Illinois, this 3d day of August, 1905.

CHAUNCEY L. GRAHAM.

Witnesses:
ROBERT BURNS,
M. H. HOLMES.